United States Patent
Simeon (10) Patent No.: US 7,460,625 B2
(45) Date of Patent: Dec. 2, 2008

(54) METHOD AND APPARATUS FOR CANCELING CROSS-CORRELATION NOISE DUE TO STRONG SERVING CELL SIGNALS

(75) Inventor: Richard Simeon, Spring City, PA (US)

(73) Assignee: InterDigital Technology Corporation, Wilmington, DE (US)

(*) Notice: Subject to any disclaimer, the term of this patent is extended or adjusted under 35 U.S.C. 154(b) by 611 days.

(21) Appl. No.: 11/236,080

(22) Filed: Sep. 27, 2005

(65) Prior Publication Data

US 2007/0049275 A1    Mar. 1, 2007

Related U.S. Application Data

(60) Provisional application No. 60/713,446, filed on Sep. 1, 2005.

(51) Int. Cl.
*H04L 25/08* (2006.01)
(52) U.S. Cl. .................................... 375/346
(58) Field of Classification Search ............. 375/142, 375/143, 150, 152, 343, 346; 704/216, 218, 704/237, 263; 708/5, 422, 813; 342/108, 342/145, 189, 378; 455/436, 439, 442
See application file for complete search history.

(56) References Cited

U.S. PATENT DOCUMENTS 5,799,004 A * 8/1998 Keskitalo et al. ............ 370/335
6,680,727 B2 * 1/2004 Butler et al. ................ 375/144
7,321,610 B2 * 1/2008 Lu ............................. 375/148
2008/0043858 A1 * 2/2008 Lim et al. ................... 375/260

* cited by examiner

*Primary Examiner*—Sam K Ahn
(74) *Attorney, Agent, or Firm*—Volpe and Koenig, P.C.

(57) ABSTRACT

A method and apparatus for canceling cross-correlation noise due to a strong serving cell signal in a wireless communication system is disclosed. The wireless communication system includes a serving cell, at least one neighbor cell and at least one wireless transmit/receive unit (WTRU). The WTRU receives a signal including a signal component transmitted by each of the serving and neighbor cells. The WTRU computes a cross-correlation of a pilot sequence of the serving cell and a pilot sequence of a target cell, and computes a target cell correlation by correlating the received signals with the pilot sequence of the target cell. The WTRU computes a cancellation signal for canceling the cross-correlation, and subtracts the cancellation signal from the target cell correlation. The WTRU then processes the cross-correlation cancelled signal for evaluation of handover.

26 Claims, 5 Drawing Sheets

METHOD AND APPARATUS FOR CANCELING CROSS-CORRELATION NOISE DUE TO STRONG SERVING CELL SIGNALS

CROSS REFERENCE TO RELATED APPLICATION

This application claims the benefit of U.S. provisional application No. 60/713,446 filed Sep. 1, 2005, which is incorporated by reference as if fully set forth.

FIELD OF INVENTION

The present invention is related to wireless communication systems. More particularly, the present invention is related to a method and apparatus for canceling cross-correlation noise due to strong serving cell signals in a wireless communication system.

BACKGROUND

In a cellular wireless communication system including a plurality of cells, a wireless transmit/receive unit (WTRU) physically moves from one cell, (i.e., communicating with a particular base station), to another cell to maintain an interruption-free connection. A cell handover is automatically performed by the WTRU through constant evaluation of signal strength of the serving cell, (i.e., the cell with which the WTRU is currently communicating), and various neighbor cells in the vicinity.

When the WTRU is locked onto a serving cell and is attempting to estimate the signal strength of a neighbor cell, the strong signal from the serving cell overpowers the signal transmitted by the neighbor cell and therefore creates measurement noise. This measurement noise may mask out the signal of the neighbor cell to the point that detection of the neighbor cell is not possible. Thus, a problem exists whereby an accurate estimate of the signal strength of the neighbor cell signal cannot be performed.

"Brute-force" detection and estimation using correlators show that if the signal power of the serving cell is approximately 15 dB stronger than the signal power of the neighbor cell signal, (i.e., a 15 dB "power spread"), the neighbor cell cannot be detected due to strong cross-correlation components from the serving cell creating a high measurement noise floor.

In a spread-spectrum cellular communication system, WTRUs typically lock onto a primary serving cell for a communication link, but continuously look for a neighbor cell that may have snore favorable signal characteristics than the primary serving cell. If such a neighbor cell is found, it may be advantageous for the WTRU to perform a handover to the neighbor cell in an attempt to improve connectivity, (as measured by data rate, voice quality, or the like).

The metric typically used to measure signal quality is the received signal code power (RSCP). For example, in a universal mobile telecommunication services (UMTS) time division duplex (TDD) system, each cell transmits a unique beacon channel containing a distinctive 456-chip sequence, (i.e., the "midamble"), orthogonal to adjacent cells. The WTRU has a priori knowledge about the available beacon channels surrounding the serving cell, and can configure an RSCP measurement unit to measure the RSCP of the serving cell and the neighbor cells. After compiling a list of candidate neighbor cells, the WTRU can evaluate the RSCPs of the neighbor cells against the RSCP of the serving cell and determine if a handover to a new cell is desirable.

In its simplest form, an RSCP measurement is the cross-correlation between a known target cell midamble and the received signal. The target cell refers to a cell for which the RSCP measurement is requested. The received signal contains the target cell midamble, other cell midambles and general receiver noise that can be modeled as additive white Gaussian noise.

Figure 1:
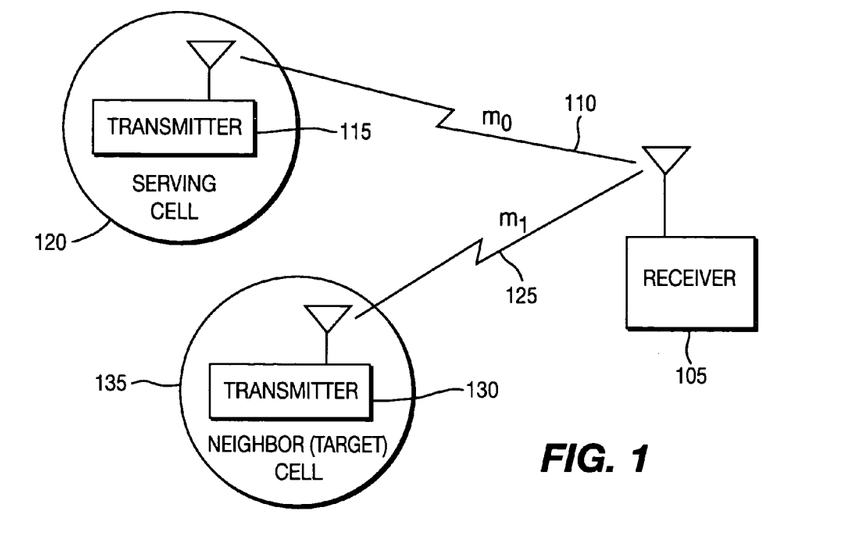
FIG. 1 shows a wireless communication system in which midambles broadcast from different cells are received and processed by a receiver.

FIG. 1 shows a cellular system which includes a receiver 105 which receives a midamble $m_0$ broadcast from a transmitter 115 in a serving cell 120, and a midamble $m_1$ 125 broadcast from a transmitter 130 in a neighbor, (i.e., target), cell 135. Because the midambles $m_0$ and $m_1$ are designed to be uncorrelated, the receiver 105 can separately detect the existence of the serving cell 120 by detecting the midamble $m_0$, as well as the existence of a neighbor cell 135 by detecting the midamble $m_1$. By computing the correlation of different midambles with the received signal, the receiver 105 detects a peak in the correlation sequence which indicates the position of the midambles, (relative to a sample window), determines the midamble strength, (proportional to the magnitude of the detected peak), and a midamble phase, (relative to a sampling phase of an analog-to-digital converter (ADC) (not shown) in the receiver 105).

Figure 2:
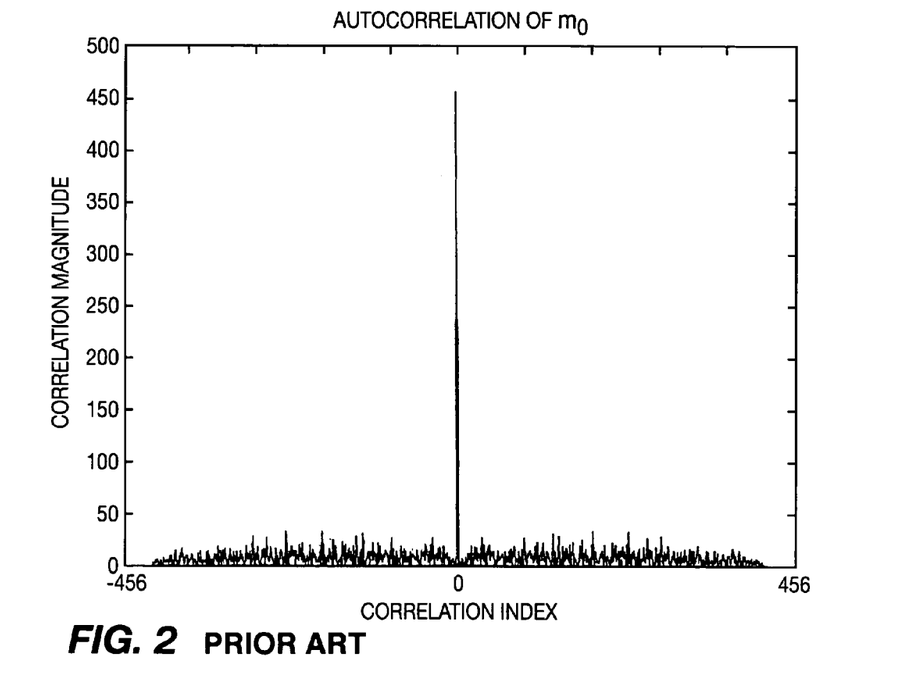
FIG. 2 is a graphical representation of autocorrelation of a midamble in a conventional receiver.

FIG. 2 shows a graphical representation of the correlation of a "typical" midamble with itself, otherwise known as the autocorrelation. Each cell has its own unique midamble. The finite length of a midamble is around 456 symbols in length.

Figure 3:
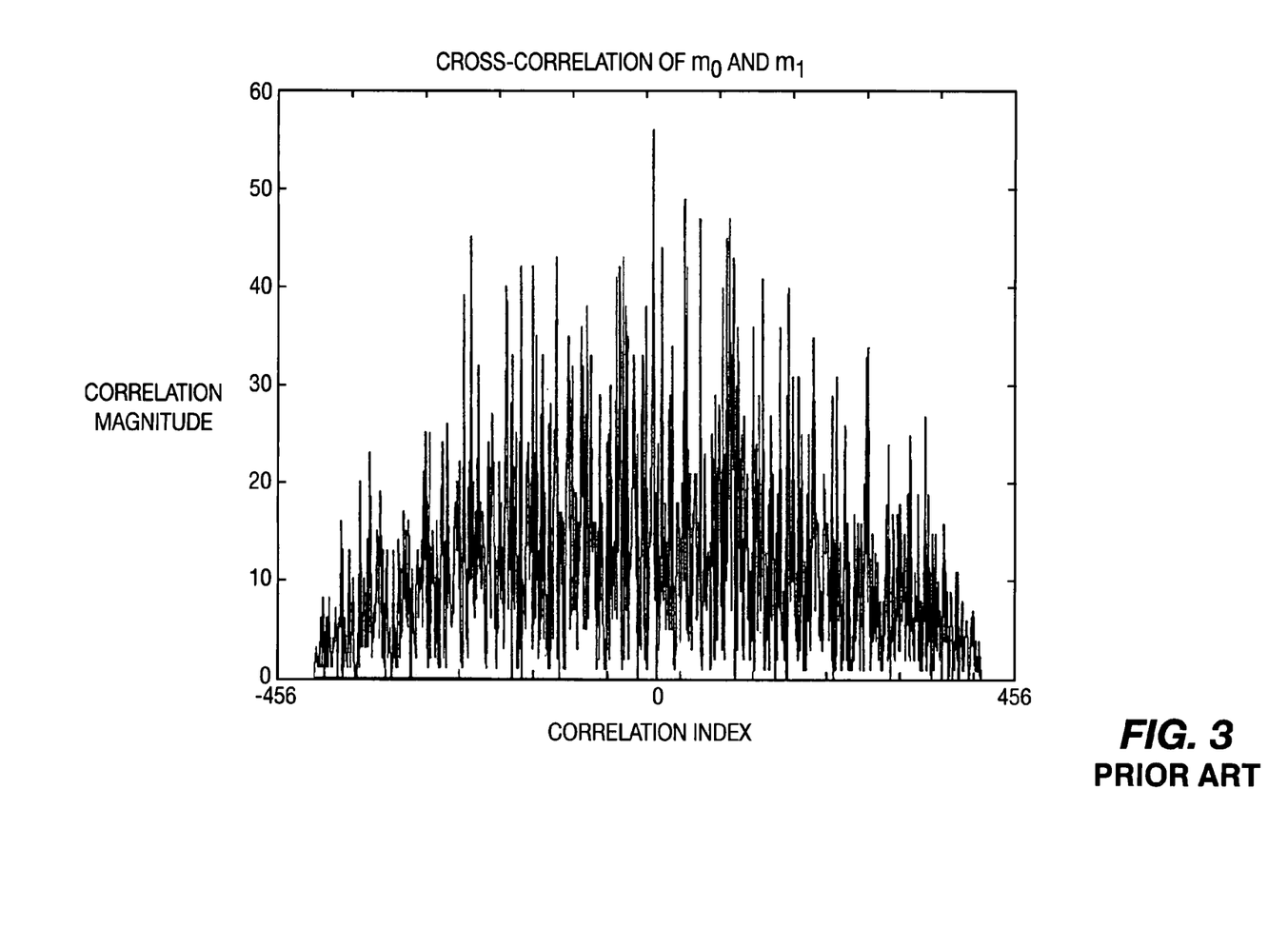
FIG. 3 is a graphical representation of cross-correlation of two midambles in a conventional receiver.

FIG. 3 shows the correlation of two different midambles, otherwise known as the cross-correlation of the two midambles, and demonstrates the fact that there is still some small degree of correlation between the midambles.

The challenge in measuring the RSCP of a target cell is that the presence of other midambles in the received signal creates measurement noise. If the signal strength of the target cell is low relative to the measurement noise, the accuracy of the estimate is degraded. Moreover, detection of the target cell may not be possible if it is buried in the noise.

When the receiver attempts to measure the RSCP of a neighbor cell in the presence of a serving cell, the strong signal of the serving cell causes an automatic gain controller (AGC) of the receiver in the WTRU to attenuate the overall received signal. Thus, the neighbor cell signal is also attenuated. If the power spread, (i.e., the difference in received signal power between the serving cell and the neighbor cell), is too high, accurate neighbor cell measurements cannot be performed because the neighbor cell power is too close to the noise floor of the receiver in the WTRU.

Figure 4:
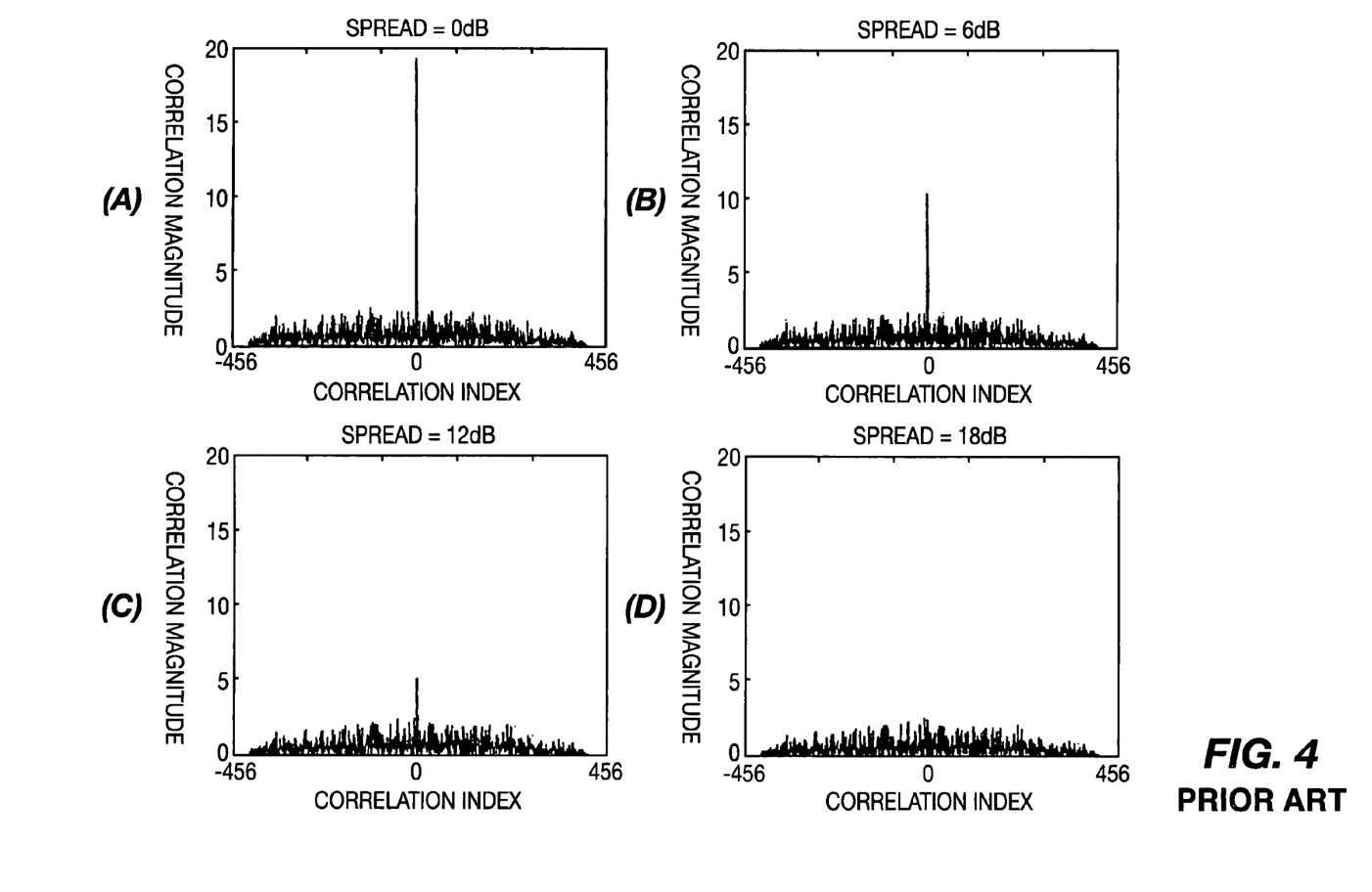
FIGS. 4A-4D are graphical representations of correlation of a neighbor cell in the presence of the strong signal of a serving cell with various power spreads in a conventional receiver.

FIGS. 4A-4D are graphical representations of correlation of a neighbor cell signal in the presence of the strong signal of the serving cell with power spreads of 0 db (FIG. 4A), 6 db (FIG. 4B), 12 db (FIG. 4C) and 18 db (FIG. 4D) in a conventional receiver. The noise floor seen in FIGS. 4A-4D is due to the cross-correlation between the serving cell and the neighbor cell. As the serving cell received power dominates over the neighbor cell received power, the correlation peak of the neighbor cell approaches the noise floor. At a spread of 18 dB, as shown in FIG. 4D, the RSCP of the neighbor cell cannot be measured because no unique peak exists. Because of the high cross-correlation noise floor created by the strong serving cell power, the presence of the neighbor cell is buried in the noise. Thus, the neighbor cell would not be detected.

SUMMARY

The present invention is related to a method and apparatus for canceling cross-correlation noise due to strong serving cell signals in a wireless communication system. The wireless communication system includes a serving cell, at least one neighbor cell and at least one WTRU. The WTRU receives a signal including a signal component transmitted by each of the serving and neighbor cells. The WTRU computes a cross-correlation of a pilot sequence of the serving cell and a pilot sequence of a target cell, and computes a target cell correlation by correlating the received signals with the pilot sequence of the target cell. The WTRU computes a cancellation signal for canceling the cross-correlation, and subtracts the cancellation signal from the target cell correlation. The WTRU then processes the cross-correlation cancelled signal for evaluation of handover.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "base station" includes but is not limited to a Node-B, a site controller, an access point (AP) or any other type of interfacing device in a wireless environment.

The features of the present invention may be incorporated into an integrated circuit (IC) or be configured in a circuit comprising a multitude of interconnecting components.

The present invention is applicable to any type of wireless communication systems, including but not limited to TDD communication systems and frequency division duplex (FDD) communication systems.

The present invention provides a method to cancel out the cross-correlation measurement noise resulting from a wide serving cell-to-target cell power spread. The present invention may provide a 22 dB improvement in measurement noise reduction, and allow for better signal detection of neighbor cells. In an environment free of thermal noise, detection of neighbor cells with 30 dB or more power spread is possible in simulation.

In accordance with the present invention, a low cost solution is possible that may be performed in software with minimal hardware upgrade; predictable and stable handover is possible due to noise-free neighbor estimates; and more accurate neighbor cell measurements is possible for signal quality reports.

Figure 5:
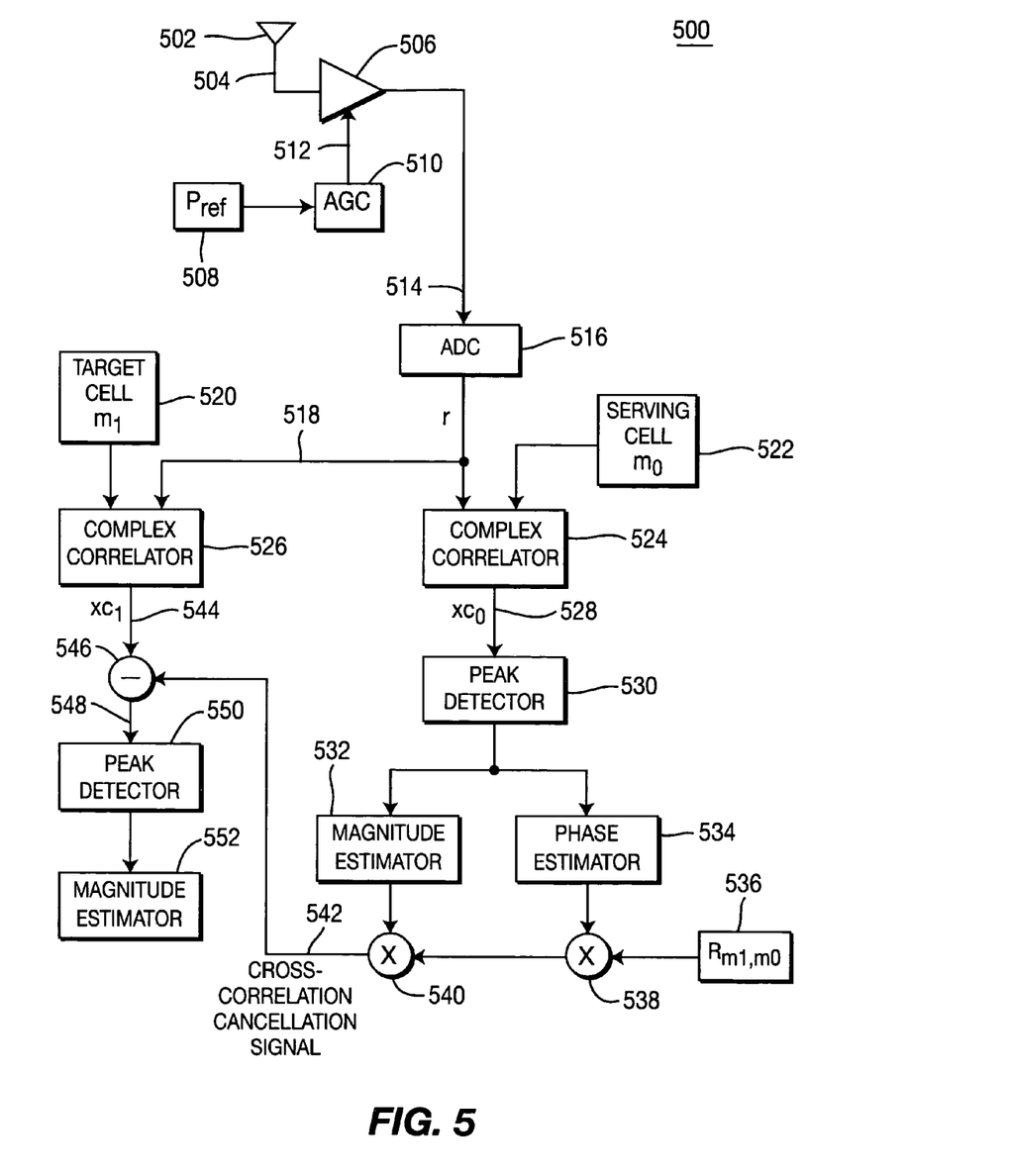
FIG. 5 is a block diagram of a receiver which is configured in accordance with the present invention.

FIG. 5 is a block diagram of a receiver 500 configured in accordance with the present invention. The receiver 500 includes an antenna 502, an amplifier 506, an AGC 510, an ADC 516, complex correlators 524, 526, peak detectors 530, 550, magnitude estimators 532, 552, a phase estimator 534, multipliers 538, 540 and a subtractor 546. A power reference value $P_{ref}$ is stored in a memory location 508 and a reference signal $R_{m0,m1}$ is stored in a memory location 536. The reference signal $R_{m0,m1}$ is a pre-computed cross-correlation between the pilot sequence, (i.e., the midamble), of the serving cell and the pilot sequence of the target cell.

As shown in FIG. 5, a signal 504 received by the antenna 102 is amplified by an amplifier 506. The received signal 504 includes a signal component from a serving cell and a signal component from a neighbor cell. The amplitude of the received signal 504 is adjusted by the AGC 510 based on the power reference value $P_{ref}$ stored in memory location 508. Thus, the AGC 510 controls the gain of the amplifier 506 via a control signal 512. The amplifier 506 outputs an amplified signal 514 which is then quantized by the ADC 516 to generate a digital signal 518 (r).

The digital signal 518 (r) enters the complex correlator 524 and at least one other complex correlator 526. The complex correlator 524 cross-correlates the reference signal of the serving cell midamble 522 ($m_0$) with the digital signal 518 (r) to generate a cross-correlated signal 528 ($xc_0$). The complex correlator 526 cross-correlates the reference signal of the target cell midamble 520 ($m_1$) with the digital signal 518 (r) to generate a cross-correlated signal 544 ($xc_1$). A peak value of the complex cross-correlation of the signal 528 ($xc_0$) is found by the peak detector 530, and the magnitude and phase of the received serving cell midamble embedded in the received signal 504 are found by the magnitude estimator 532 and the phase estimator 534, respectively.

Once the magnitude and the phase of the received serving cell midamble ($m_0$) are estimated by the magnitude estimator 532 and the phase estimator 534, respectively, a reference signal ($R_{m1,m0}$) stored in a memory 536 is scaled and phase-rotated using the multipliers 538 and 540 in accordance with the estimated magnitude and phase of the serving cell midamble ($m_0$) to produce a cross-correlation cancellation signal 542.

The cancellation signal 542 is then subtracted from the cross-correlated signal 544 ($xc_1$) by the subtractor 546 to generate a signal 548 for which the cross-correlation of the target cell and the serving cell has been canceled. Following the cancellation of the cross-correlation component $R_{m1,m0}$, a normal process is performed including a peak detection by the peak detector 550 and a magnitude estimation by the magnitude estimator 552.

The peak detector 550 detects a peak which indicates the presence of a neighbor cell, (i.e., the target cell exists). The magnitude estimator 552 generates an RSCP estimate, whereby the magnitude of the peak is proportional to the RSCP.

Figure 6:
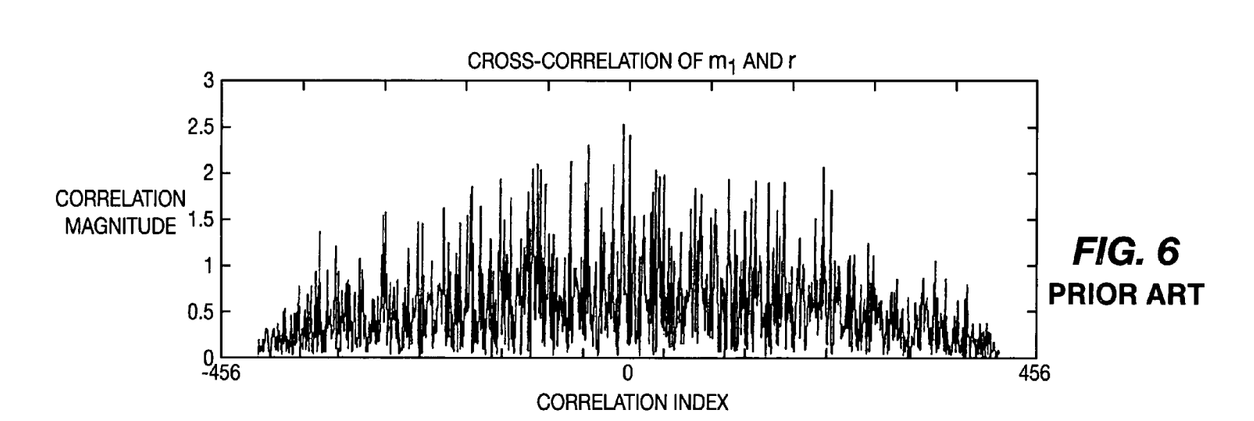
FIG. 6 shows simulation results of an 18 dB serving cell to target cell power spread using a conventional receiver.

FIG. 6 shows simulation results of an 18 dB serving cell to target cell power spread using a conventional receiver. As shown in FIG. 6, without cancellation, the peak is buried in the cross-correlation noise such that peak detection would fail and the neighbor cell would not be detected.

Figure 7:
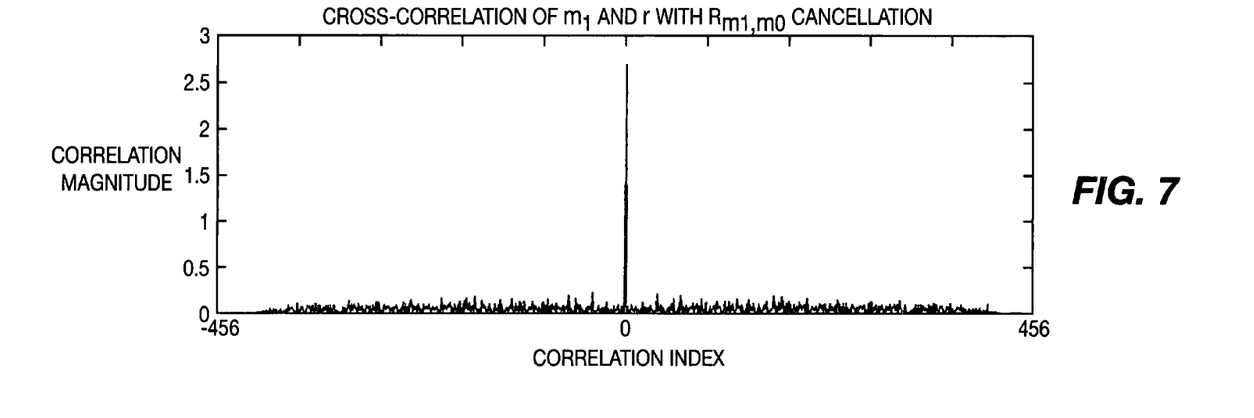
FIG. 7 shows simulation results of an 18 dB serving cell to target cell power spread using the receiver of FIG. 5.

FIG. 7 shows simulation results of an 18 dB serving cell to target cell power spread using the receiver 500 of FIG. 5. As shown in FIG. 7, a distinctive peak is detected which indicates the presence of a weak cell.

Although the features and elements of the present invention are described in the preferred embodiments in particular combinations, each feature or element can be used alone without the other features and elements of the preferred embodiments or in various combinations with or without other features and elements of the present invention.

What is claimed is:

1. In a cellular wireless communication system including a plurality of cells wherein a wireless transmit/receive unit (WTRU) monitors signal strength from a serving cell and at least one neighbor cell for handover, and each cell transmits a unique pilot sequence, a method for canceling cross-correlation noise due to strong serving cell signals, the method comprising:
   (a) receiving signals from a serving cell and at least one target cell;
   (b) computing a cross-correlation of a pilot sequence of the serving cell and a pilot sequence of the target cell;
   (c) computing a target cell correlation by correlating the received signals with the pilot sequence of the target cell;
   (d) computing a cross-correlation cancellation signal for canceling the cross-correlation noise;
   (e) subtracting the cross-correlation cancellation signal from the target cell correlation; and
   (f) processing the result of step (e) for evaluation of handover from the serving cell to the target cell.

2. The method of claim 1 further comprising:
   computing a serving cell correlation by correlating the received signals with a pilot sequence of the serving cell; and
   generating the cancellation signal by scaling and phase-rotating a reference signal in accordance with an estimated magnitude and phase of the serving cell pilot sequence.

3. The method of claim 2 wherein the reference signal is a pre-computed cross-correlation between the pilot sequence of the serving cell and the pilot sequence of the target cell.

4. The method of claim 1 wherein the pilot sequences are midamble code sequences.

5. The method of claim 1 wherein the wireless communication system is a time division duplex (TDD) system.

6. The method of claim 1 wherein the wireless communication system is a frequency division duplex (FDD) system.

7. In a cellular wireless communication system including a plurality of cells wherein a wireless transmit/receive unit (WTRU) monitors signal strength from a serving cell and at least one neighbor cell for handover, and each cell transmits a unique pilot sequence, an apparatus for canceling cross-correlation noise due to strong serving cell signals, the apparatus comprising:
   (a) an antenna for receiving signals from a serving cell and at least one target cell;
   (b) a memory for storing a cross-correlation of a pilot sequence of the serving cell and a pilot sequence of the target cell;
   (c) a first correlator for computing a target cell correlation by correlating the received signals with the pilot sequence of the target cell;
   (d) a cancellation signal generator for computing a cancellation signal for canceling the cross-correlation noise;
   (e) a subtractor for subtracting the cancellation signal from the target cell correlation; and
   (f) a down-stream processor for processing a signal output by the subtractor for evaluation of handover from the serving cell to the target cell.

8. The apparatus of claim 7 further comprising:
   (g) a second correlator for computing a serving cell correlation by correlating the received signals with a pilot sequence of the serving cell, whereby the cancellation signal generator generates the cancellation signal by scaling and phase-rotating a reference signal in accordance with an estimated magnitude and phase of the serving cell pilot sequence.

9. The apparatus of claim 8 wherein the reference signal is based on the pre-computed cross-correlation stored in the memory.

10. The apparatus of claim 7 wherein the pilot sequences are midamble code sequences.

11. The apparatus of claim 7 wherein the wireless communication system is a time division duplex (TDD) system.

12. The apparatus of claim 7 wherein the wireless communication system is a frequency division duplex (FDD) system.

13. In a cellular wireless communication system including a plurality of cells wherein a wireless transmit/receive unit (WTRU) monitors signal strength from a serving cell and at least one neighbor cell for handover, and each cell transmits a unique pilot sequence, a method for canceling cross-correlation noise due to strong serving cell signals, the method comprising:
   (a) receiving signals from a serving cell and at least one target cell;
   (b) generating a target cell correlation signal and a serving cell correlation signal;
   (c) generating a cross-correlation cancellation signal by cross-correlating a pilot sequence of the serving cell and a pilot sequence of the target cell;
   (d) subtracting the cross-correlation cancellation signal from the target cell correlation signal; and
   (e) processing the result of step (d) for evaluation of handover from the serving cell to the target cell.

14. The method of claim 13 wherein the cross-correlation is stored in a memory.

15. The method of claim 13 wherein the cross-correlation is scaled and phase-adjusted based on peak correlation of the serving cell pilot sequence and the received signal.

16. In a cellular wireless communication system including a plurality of cells wherein a wireless transmit/receive unit (WTRU) monitors signal strength from a serving cell and at least one target cell for handover, and each cell transmits a unique pilot sequence, an apparatus for canceling cross-correlation noise due to strong serving cell signals, the apparatus comprising:
   (a) an antenna for receiving signals from a serving cell and at least one target cell;
   (b) a complex correlator for correlating a pilot sequence of the target cell with the received signals;
   (c) a cross-correlation canceling unit for subtracting a cancellation signal generated by cross-correlating a pilot sequence of the serving cell and the pilot sequence of the target cell from the target cell correlation; and
   (d) a post processing unit for processing the output of the cross-correlation canceling unit for evaluation of handover from the serving cell to the target cell.

17. The apparatus of claim 16 further comprising a memory for storing the cross-correlation.

18. The apparatus of claim 16 wherein the cross-correlation is scaled and phase-adjusted based on peak correlation of the serving cell pilot sequence and the received signal.

19. A receiver comprising:
   (a) an antenna for receiving signals from a serving cell and at least one target cell;

(b) a memory for storing a cross-correlation of a pilot sequence of the serving cell and a pilot sequence of the target cell;
(c) a first correlator for computing a target cell correlation by correlating the received signals with the pilot sequence of the target cell;
(d) a cancellation signal generator for computing a cancellation signal for canceling cross-correlation noise due to strong serving cell signals;
(e) a subtractor for subtracting the cancellation signal from the target cell correlation; and
(f) a down-stream processor for processing a signal output by the subtractor for evaluation of handover from the serving cell to the target cell.

20. The receiver of claim 19 further comprising:
(g) a second correlator for computing a serving cell correlation by correlating the received signals with a pilot sequence of the serving cell, whereby the cancellation signal generator generates the cancellation signal by scaling and phase-rotating a reference signal in accordance with an estimated magnitude and phase of the serving cell pilot sequence.

21. The receiver of claim 20 wherein the reference signal is based on the pre-computed cross-correlation stored in the memory.

22. The receiver of claim 19 wherein the pilot sequences are midamble code sequences.

23. An integrated circuit (IC) incorporated in a receiver having an antenna for receiving signals from a serving cell and at least one target cell, the IC comprising:

(a) a memory for storing a cross-correlation of a pilot sequence of the serving cell and a pilot sequence of the target cell;
(b) a first correlator for computing a target cell correlation by correlating the received signals with the pilot sequence of the target cell;
(c) a cancellation signal generator for computing a cancellation signal for canceling cross-correlation noise due to strong serving cell signals;
(d) a subtractor for subtracting the cancellation signal from the target cell correlation; and
(e) a down-stream processor for processing a signal output by the subtractor for evaluation of handover from the serving cell to the target cell.

24. The IC of claim 23 further comprising:
(f) a second correlator for computing a serving cell correlation by correlating the received signals with a pilot sequence of the serving cell, whereby the cancellation signal generator generates the cancellation signal by scaling and phase-rotating a reference signal in accordance with an estimated magnitude and phase of the serving cell pilot sequence.

25. The IC of claim 24 wherein the reference signal is based on the pre-computed cross-correlation stored in the memory.

26. The IC of claim 23 wherein the pilot sequences are midamble code sequences.

* * * * *

UNITED STATES PATENT AND TRADEMARK OFFICE
CERTIFICATE OF CORRECTION

PATENT NO. : 7,460,625 B2  
APPLICATION NO. : 11/236080  
DATED : December 2, 2008  
INVENTOR(S) : Richard Simeon Page 1 of 1

It is certified that error appears in the above-identified patent and that said Letters Patent is hereby corrected as shown below:

At column 1, line 50, before the word "favorable" delete "snore" and insert therefore --more--.

At column 2, line 50, after the words "spreads of" delete "0db (FIG.4A), 6db" and insert therefore --0dB (FIG.4A), 6dB--.

At column 2, line 51, after "(FIG.4B)," delete "12db (FIG.4C) and 18db" and insert therefore --12dB (FIG.4C) and 18dB--.

Signed and Sealed this

Twenty-fourth Day of March, 2009

JOHN DOLL  
*Acting Director of the United States Patent and Trademark Office*